United States Patent [19]

Becker

[11] Patent Number: 5,083,655
[45] Date of Patent: Jan. 28, 1992

[54] ACCUMULATOR CONVEYOR

[75] Inventor: Lynn T. Becker, Byron, Mich.

[73] Assignee: OMNI Technical Services, Inc., Lansing, Mich.

[21] Appl. No.: 630,371

[22] Filed: Dec. 18, 1990

[51] Int. Cl.[5] ............................................. B65G 47/26
[52] U.S. Cl. .................................. 198/460; 198/464.3; 198/572; 198/817; 198/842
[58] Field of Search ................. 198/460, 464.3, 817, 198/842, 572, 579

[56] References Cited

U.S. PATENT DOCUMENTS

| | | | |
|---|---|---|---|
| 1,731,609 | 10/1929 | Brayton | 198/842 |
| 1,738,520 | 12/1929 | Beadle | 198/842 X |
| 1,809,200 | 6/1931 | Guille | 198/842 |
| 1,816,327 | 7/1931 | Hise | 198/842 X |
| 2,167,883 | 8/1939 | Ferree | 198/842 X |
| 3,075,630 | 1/1963 | Fisk | 198/76 |
| 3,193,081 | 7/1965 | Harrison et al. | 198/572 |
| 3,370,693 | 2/1968 | Marsden | 198/34 |
| 3,485,339 | 12/1967 | Miller | 198/34 |
| 3,513,960 | 5/1970 | Adams | 198/34 |
| 4,227,607 | 10/1980 | Malavenda | 198/572 X |
| 4,287,983 | 9/1981 | Bronsveld | 198/817 |
| 4,446,963 | 5/1984 | Renner | 198/842 X |

*Primary Examiner*—D. Glenn Dayoan
*Attorney, Agent, or Firm*—Miller, Morriss & Pappas

[57] ABSTRACT

An Accumulator Conveyor having plural zones in which beds or tracks of closely positioned roller elements provide a planar support for moving chains or driven endless elements in successive zones, each zone separately driven from the others. At each end of the zone is a shaft which extends across the conveyor. A drive is connected to each shaft and drives the chains or driven endless elements at one end of each zone and the endless elements idle over the shaft on the other end. The drive is selectively energized to result in an extremely low friction conveyor and is coordinated to result in the accumulating function. In each successive zone the bed or track is offset or staggered from the next in parallel aspect in providing planar bridging support of the endless elements across each of the zone transitions.

3 Claims, 4 Drawing Sheets

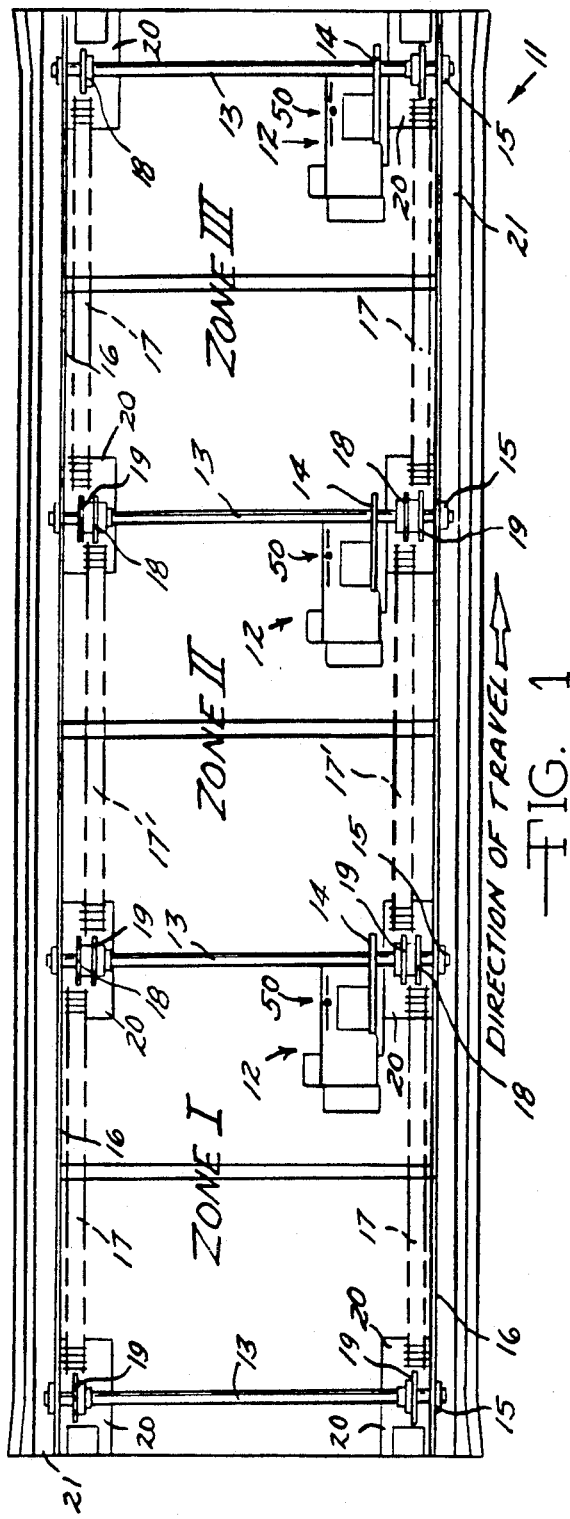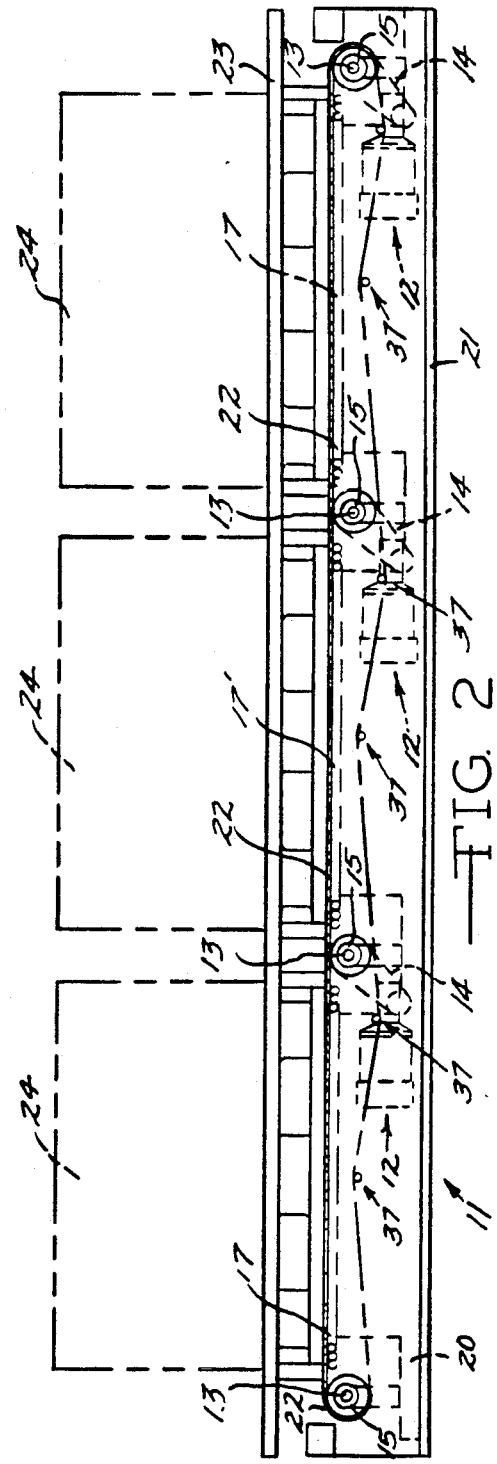

ACCUMULATOR CONVEYOR

This application is a continuation application of application Ser. No. 360,485 filed on June 2, 1989 and now abandoned.

The present invention relates to an accumulator conveyor having improved operational economy, excellent flexibility for interfacing with a wide variety of technological work stations and stock movement to and through those stations and which is capable of precision location of stock as between plural sequence interrelated zones.

BACKGROUND OF THE INVENTION

An accumulator conveyor is a conveyor in which objects moved thereon are carried forward, usually in units as on a pallet, to a work or stop position. Subsequent pallets thereupon stop successively awaiting movement of the first stopped unit whereupon all subsequent pallets, then move up to fill the void.

Such devices are best represented by the work of Robert E. Adams in the U.S. Pat. No. 3,513,960 in which conveyor rolls are driven in zones interconnected by link chain and the rolls within each zone are connected to each other for drive of the entire group within the zone. A common motor serves plural zones and a clutch at the commencement of each successive zone engages the chain drive when the load carried by the rolls (as for example a pallet) is depressed starting the driving of all of the rolls in the particular zone. Thus the clutches determine whether or not particular zones function.

In the structure of the present invention each zone is separately powered and the gap between zones is avoided. The driven surface of each zone is a continuous or endless chain transfer system backed by a simple anti-friction roller bed. A staggered overlap of transfer chain in successive zones assures smooth transition of movement between zones and the drive from a single low powered motor advances the work placed on a platform or pallet in each of the zones to a predetermined rest point. The efficiency of the anti-friction chain bed materially reduces power requirements of prior known devices. Common head and tail idling and drive sections between adjacent zone allows the handling of footprints as narrow as 1 inch. The amenability to electrical and electronic sequential control allows a high rate of material transfer due to the zone efficiency reflected in the minimum horsepower requirements and each zone functions as a safety brake in the event of zone malfunction. This also permits precision location of stop and dwell positions as between the zones and makes possible manufacturing procedures or operations at these selected control stop positions. The high efficiency low power provides a self protection feature in each zone so that the motor on overload as by any function generative of a stall condition trips the motor starter heaters. The simplicity of the presently described system allows manual movement of the loads upon disconnect of the input drive or transfer chain and the loads are easily travelled upon the high efficiency transfer bed of each zone. Similarly reversal of the unit is possible to allow clean-out of the structure.

At all times the required zone power is reduced and saves energy and destruction of equipment while the total work achievement accomplishes the accumulator conveyor objectives of material flow.

Accordingly, the principal object of the present invention is to present an accumulating conveyor having plural successive zones in which all zones are provided with separate anti-friction roller beds in support of separate transfer chains that support successive loads and in which each zone is separately powered overlapping the zone directly ahead and directly behind except, of course, for the first zone and the last zone where the overlap occurs in adjacent zones and characteristic motor controls are easily integrated with selected industrial needs.

Another objective is to provide an accumulating conveyor structure in which frictional drag is minimal with attendant lower power requirements and greater flexibility as between zones since individual control of the motors allows selective stopping and starting within selected zones.

Still another object is the provision of an accumulating conveyor on relatively simple foundations easily, adjustable as to height and leveling of zones, and extendable lengthwise by addition of zone modules.

The pallet support of objects moved on the conveyor is adaptable to precision guidance and relative open space beneath the courses permits collateral location of manufacturing and processing equipment all adapted to electronic stop control coordinating selected treatment of work pieces.

In all, those comprehending the present accumulating conveyor will understand the substantial savings in maintenance installation and running costs as well as the achievement of extended flexibility and utility in the new and useful structure.

BRIEF DESCRIPTION OF THE DRAWINGS

In the drawings:

FIG. 1 is a top plan view of an accumulating conveyor in accord with the present invention indicating the separate powering of the zones therein and staggered support of the transfer chain on roller beds as between adjacent zones.

FIG. 2 is a side elevation view of the accumulating conveyor of FIG. 1 and in phantom line indicating the plural zones as loaded and movable from left to right.

DESCRIPTION OF THE PREFERRED EMBODIMENT

Figure 3:
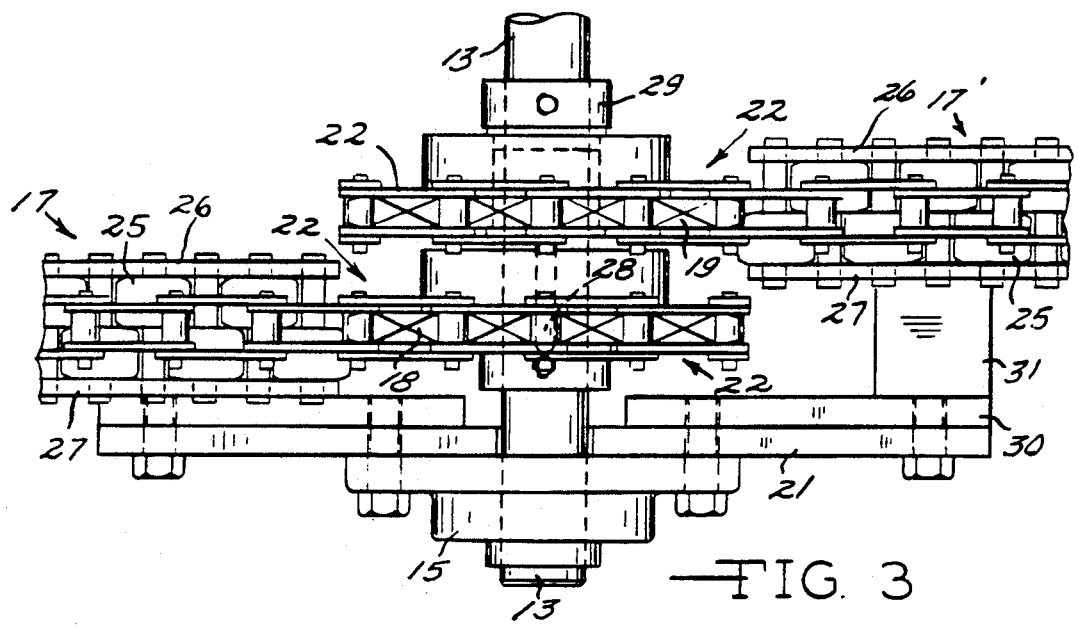
FIG. 3 is a fragmental top plan view of the transfer chain of adjacent zones in which one sprocket is keyed to drive by the shaft and the other sprocket on the common shaft idles on that shaft. The transfer chains are bedded on the anti-friction rollers supported in a rail-like frame.

In general the present invention comprises a plurality of linked individual zones, the bed for each zone supported by a simple leveling frame providing supports for a plural of spaced apart rail elements each rail element supporting a plurality of individual anti-friction rollers, which rollers support a continuous moving and load bearing transfer chain. The transfer chain is driven by chain sprockets and the sprockets are driveably supported on a journalled axle or shaft so that driving one of the sprockets by a motor and gear reducer means from one side and one end of each zone also powers and coordinates the transfer chain movement on the parallel spaced apart rail elements. On the same shaft are plural idler sprockets free to rotate and support a continuous transfer chain driven by drive means in a next adjacent zone. Thus the idler sprockets at one of the zones define the plane of movement of the transfer chain and of the drive sprockets in the next adjacent zone. That next adjacent zone is supported on plural rails serving the plane of movement in the adjacent zone staggered over from the rails in the first mentioned zone and the drive sprockets in the next adjacent zone are in alligned planar relation with the idler sprockets on the shaft of the first zone and the drive sprockets in the second mentioned zone are mounted for rotation on a shaft that is independently driven by a separate motor and gear reducer combination. The continuous transfer chains, in spaced apart relation in the second mentioned zone, find idling support at the end opposite the motor-reducer drive end of the preceeding zone. Similarly the second mentioned zone is thus connected to the drive shaft of the third zone, and the transfer chain in that zone is then staggered in its alignment to the second zone transfer chain back to registering parallelity with the plane of the first mentioned transfer chain.

As a consequence, the only transverse barriers in the conveyor flow in each zone are the shafts fore and aft of the zone and the shafts do not support the static burden of the load and the transition between zones of the load on the support rollers on the common shaft minimizes any break in continuity as between the zones. The resulting accumulator conveyor structure permits easy access to the motor-reducer power sources for maintenance or repair and opens the free space to work stations beneath the load or work piece moving on the guided path of the conveyor transfer chain as defined between the rails and the major stresses are directly translated into a simple frame base structure. Control of the individual zones allows precision location of the load as at successive work stations while achieving high efficiency work flow timed and coordinated with adjacent zones. Sensors in the form of limit switches, light interference modules and even timers and counters are some of the control links that provide key controls in well known electronic and electrical circuits for selective sequencing in each zone and in coordinated movement in successive zones. Thus specific controls are not the subject of the present invention but will be well appreciated by those skilled in the control art as applied to the independently powered zones in the present structure.

SPECIFIC DESCRIPTION

Referring to the Drawings and with first reference to the FIG. 1 showing a preferred embodiment of the invention an accumulator conveyor 11 having plural zones I, II and III as shown and the direction of travel is from left to right. Each zone I, II and III is separately powered by a motor-driven gear reducer 12 driveably connected to a shaft 13 as by the indicated motor drive chain 14. While a conveyor unit 11 of only three units or zones is shown it will be appreciated as an understanding of this invention progresses, that additional zone modules as zones I, II and III can be added fore and aft in extension of the conveyor 11, each module performing as exemplified in FIG. 1 and claimed herein.

The shaft 13 extends transversely of the conveyor flow and is journalled on both ends in pillow block bearings 15 secured to elongate spaced apart frame and rail members 16. The rail members 16, as will be seen, additionally provide support for anti-friction roller beds 17 and 17' which are supported between rail members 16 and other inner rail structure. The beds 17 and 17' will be understood to carry the continuous transfer chain serving each zone as powered by the rotation of the drive sprockets 18 keyed to the shaft 13, and the sprockets 19 in each zone. It is to be noted that the bed 17' in Zone II is staggered inboard of the bed 17 in the next adjacent zones I and III so as to utilize idling sprockets 19 supported on the preceding shaft 13, the sprockets 19 in planar register with drive sprocket 18. In this manner each zone I, II and III is separately driven with transfer chains serving that zone and idling on the drive shaft 13 of the next adjacent zone whereby there is no interference as between zones and the transfer chain carrying the load moves on the anti-friction bed of rollers 17 and 17'. The staggered relationship of zones is repeated as desired permitting an existing conveyor line to be extended or reduced by the addition or subtraction of zones. Load from the rails 16 and from the shafts 13 is conducted into simple foundations 20 and the structural frame 21 is easily leveled to match the elevation support of the next adjacent zones. In some instances the foundations 20 need only be flat plates anchored to a floor in prevention of shifting.

The shaft 13 at the start of zone I does not include a drive sprocket 18 unless the starting end of the accumulator conveyor is extended. At the tail end of the zone III the idling sprocket 19 is not included unless another zone is added.

In most instances the loads applied to conveyor 11 are palletized and loads or work progresses as shown in FIG. 2 from fork truck loading as shown at the left to the unloading position as by fork truck or otherwise at the right. In FIG. 2 the frame 21 is seen which carries the loading into the foundations 20 upon which the frame 21 rests and the endless transfer chain 22 is visible riding on the anti-friction beds 17, 17' and driven selectively by the motor reducers 12 which chain drive the shafts 13 by means of the reducer drive chains 14. In addition the load guides 23 on the sides of the frame 21 flank the loads 24 in their desired flow path.

In FIG. 3 the fragmental portion on the shaft 13 best illustrates the beds 17 and 17' of the anti-friction rollers 25, the rollers 25 journalled between rail plates 26 and 27 in staggered relation. Thus the beds 17 and 17' provide a railed track supporting the continuous drive chains 22 in level paths and the transfer chains 22 then pass over the sprockets 18 (driven) and 19 (idling). The sprockets 18 are keyed to the shaft 13 by the key 28 and the sprocket 19 rotates freely on the shaft 13 restrained only against axial displacement as by collar 29. The shaft 13 is supported at its ends in the pillow block bearings 15 bolted or otherwise affixed to the frame 21. The frame 21 also supports rails 26 and 27 of the beds 17 and 17'. The bracket plates 30 and 31 carry the thrust into the frame 21 and thence to the foundation elements 20 (FIG. 1).

The structure of FIG. 3 is present at both journalled ends of the shafts 13 intermediate adjacent zones. The common shafts 13 between zones function as a head and a tail shaft in carrying both drive sprockets 18 for one zone and 19 for the adjacent zone.

Figure 4:
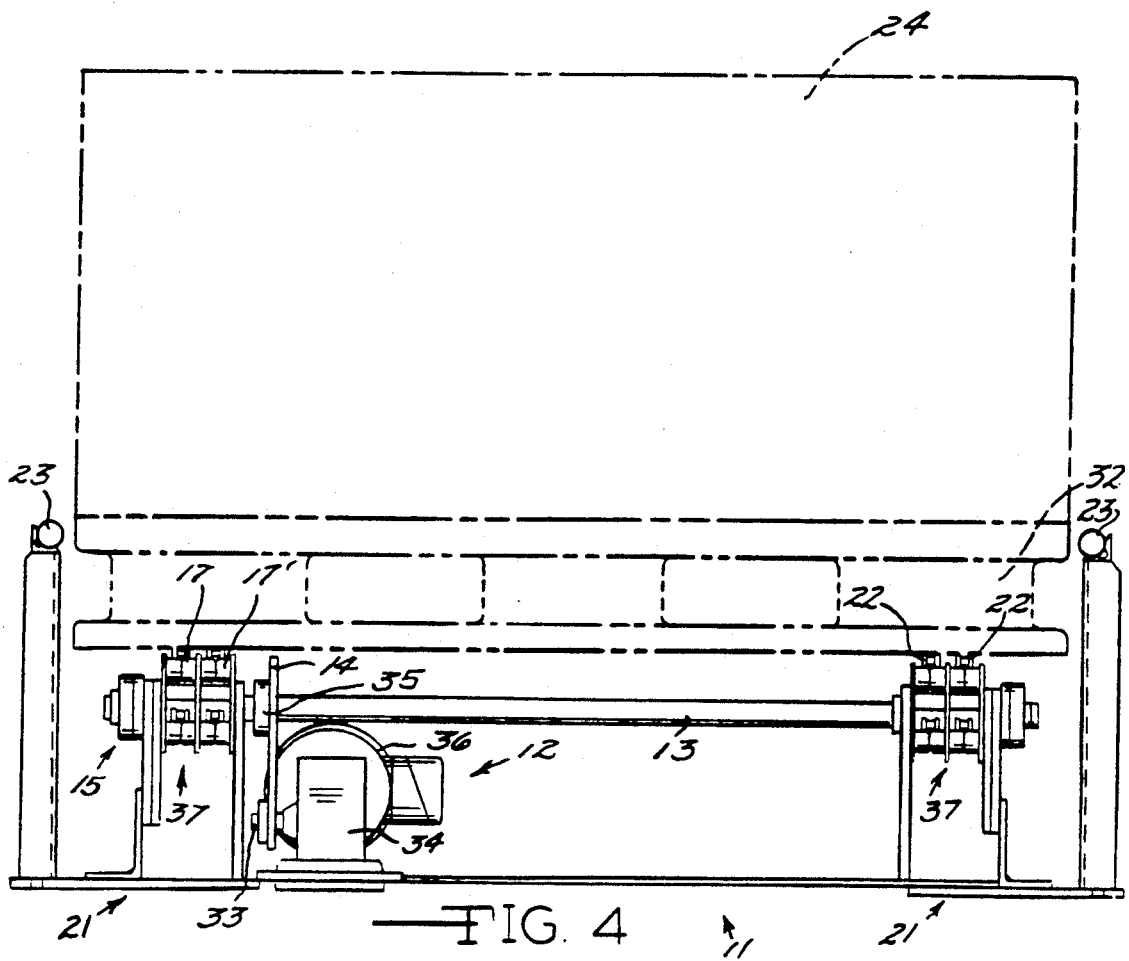
FIG. 4 is an end elevation view of the accumulating conveyor and illustrating an end view of the work piece and its supporting pallet carried on the transfer chain and the transfer chain supported on the roller beds. The individual power drive is indicated in drive relation to the shaft and the simplicity of the rail support structure is appreciated as well as the lateral control guides for the stock or pallets.

FIG. 4 shows a load or workpiece 24 resting on its pallet 32 and guided between the flanking guide rails 23. The motor-gear reducer unit 12 is seen secured on the frame 21 and motor drive chain 14 extends from the shaft 33 of the reducer 34 and to the sprocket 35 driveably connected to the shaft 13. The motor 36 is of the electric type. However, other power options, i.e. hydraulic, pneumatic or otherwise could be drivably connected to each zone, either directly or via chain drive couplings to provide powered rotational movement of the shaft 13 and consequent turning of the sprockets 18 and connected load bearing transfer chain 22 riding on the roller beds 17, 17'. In the FIG. 4 the transfer chain 22 runs over the idler tensioning rolls 37 for applying proper tension to the transfer chain. This is also visible in FIG. 2. The tensioning guide rolls 37 are selectively contacting the return course of the drive chain 22 beneath the roller beds 17, 17'.

Figure 5:
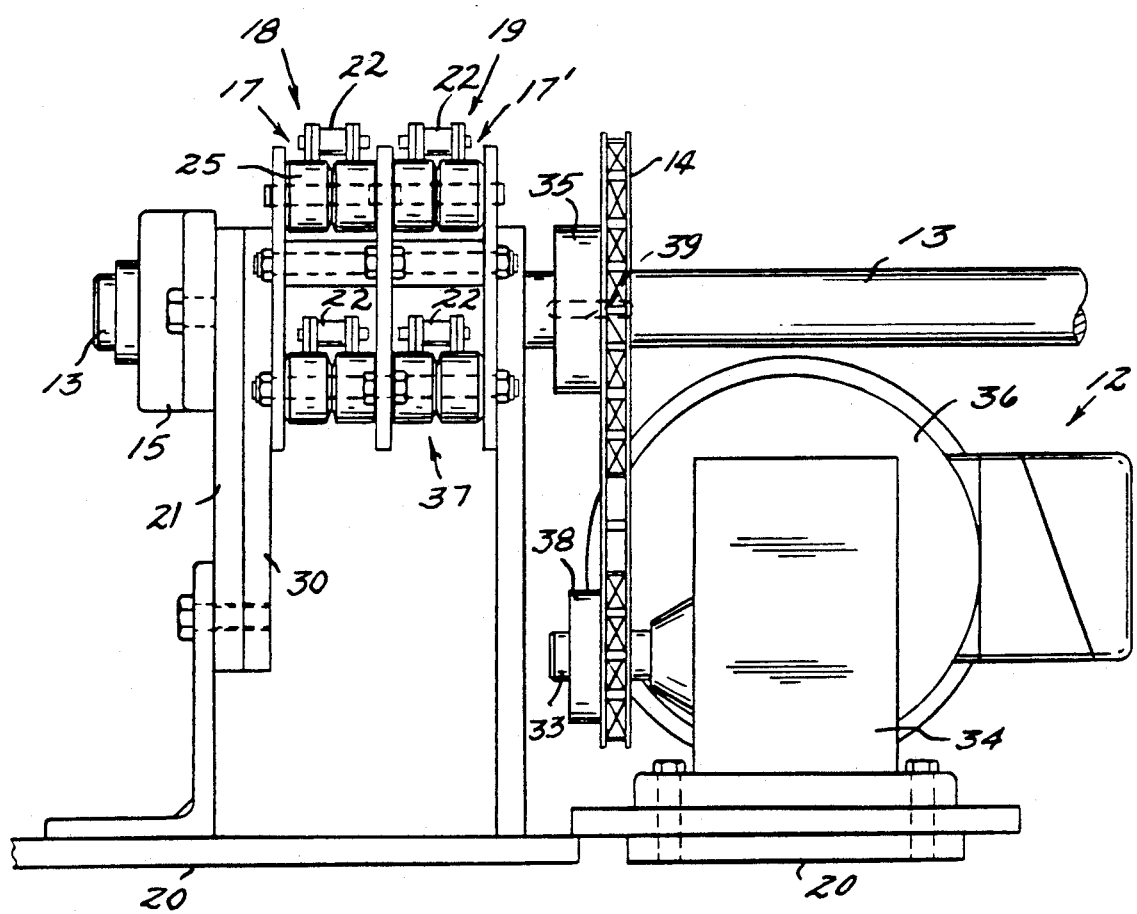
FIG. 5 is an enlarged end view of the motor, gear reducer and drive chain connector for the driven transfer chain and the adjacent idling transfer chain in the adjacent course.

By reference to FIG. 5 the motor-reducer 12 is better appreciated in its drive connection to the shaft 13 by the chain drive 14 interconnecting the reducer 34 by means of its sprocket 38 on shaft 33 to the sprocket 35 keyed to the shaft 13 as by key 39. The inner and outer roller beds 17 and 17' provide anti-friction support for movement of the continuous conveyor transfer chains 22 and the chains 22 on their return course ride on the tensioning idler rolls 37 tracking the chains 22 in their respective routes over the sprockets 18 and 19 as previously described. The shaft is better shown in the pillow block 15 providing anti-friction shaft journalling secured to the frame 21.

Figure 6:
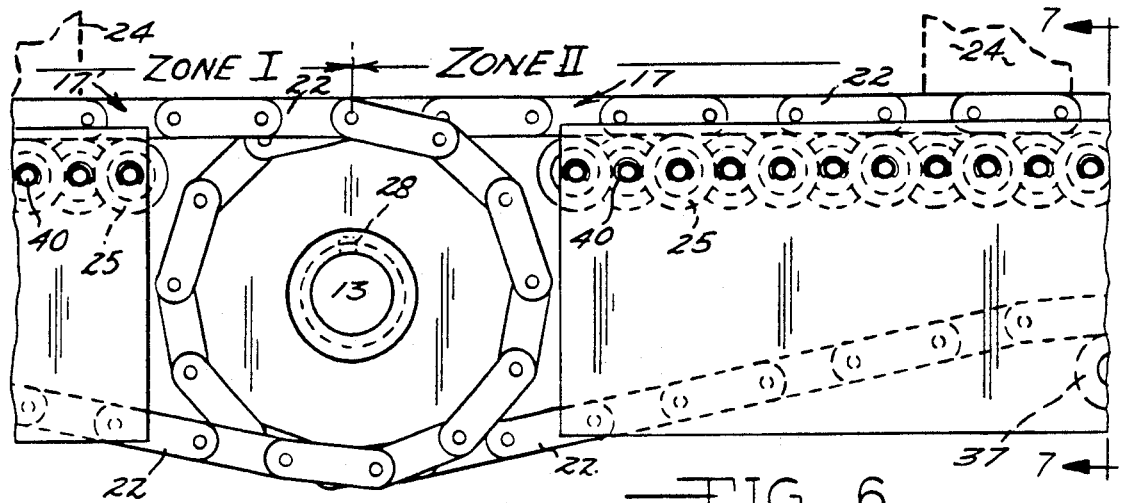
FIG. 6 is a side elevation view of the transfer chain and roller bed relationship viewed at the shaft intermediate adjacent zones.

In the FIG. 6 the transfer chains 22, serving zone I and zone II characterize the common shaft 13 supporting the transfer drive sprockets 18 and idler sprocket 19, one of those sprockets 18 being driven by the movement of shaft 13 and one sprocket 19 freely turning or idling on the same shaft 13 at all drive locations as indicated in FIGS. 1 and 2. The anti-friction bed 17 and 17' are seen comprising plural rollers 25 (high capacity bearing type) supported in rail plates in spaced apart relation, the rail plates supporting the axles 40 for the rollers 25. The rollers 25, as shown in FIG. 6 may be in staggered relation or in adjacent relations and the load is transmitted from the transfer chains 22 to the rollers 25 and into the rail plates and to the frame 21 and into the supporting base or foundation 20 best seen in FIG. 7. As previously mentioned both ends of the shafts 13 are identically but oppositely supported and the transfer chains 22 on each side of the conveyor 11 are identically supported on the beds 17 and 17'.

Figure 7:
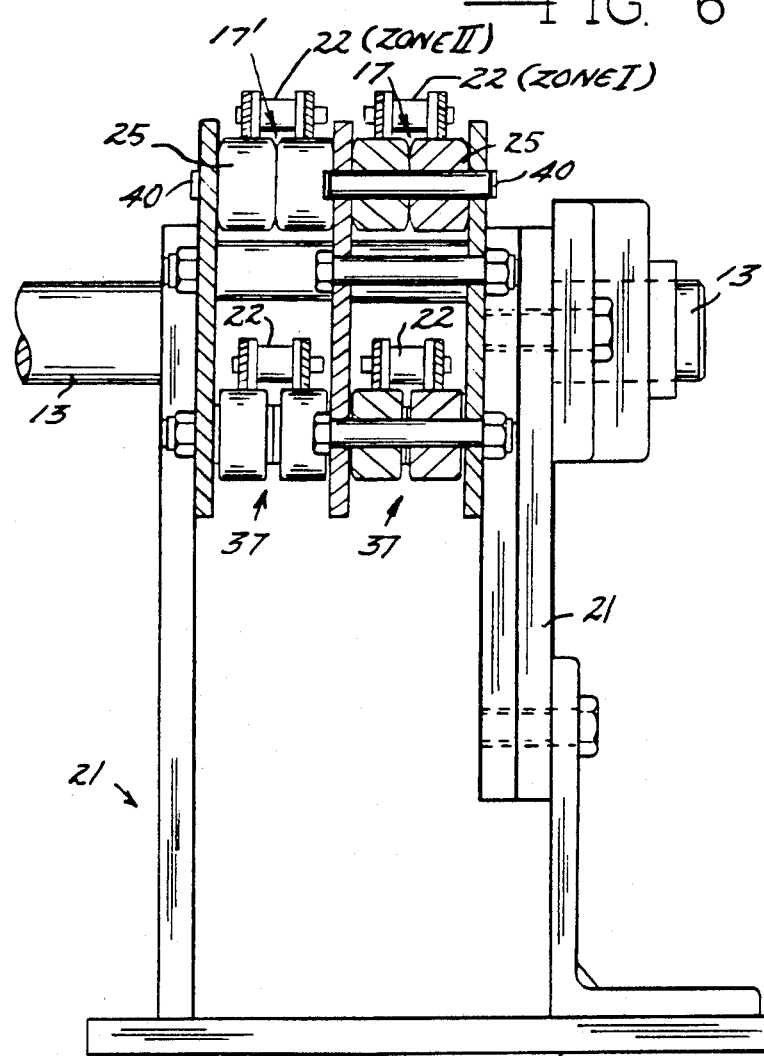
FIG. 7 is an end elevation view of spaced apart journalling opposite the powered drive side of the accumulating conveyor and showing the idling tension rollers beneath the flow path of the continuous transfer chain

The section view of FIG. 7 further illuminates the FIG. 6 at end of the shaft 13 and where shaft 13 finds support in the pillow block bearings 15 secured to the frame 21. On the return course in both zone I and zone II the transfer chains 22 travel over the tensioning idle rollers 37.

Having thus described the preferred operable embodiment the operation of the structure and modifications therein falling within the scope of the hereinafter appended claims will be appreciated since for the first time a drive shaft between successive zones in an accumulator conveyor is separately powered from the next zone while supporting relative but independent movement in adjacent zones. Since the starting and stopping of the drive in each stage is separate from the adjacent stages while possessing, in common, the characteristics of the accumulator conveyors in progressing stage-to-stage only as the preceding stage is vacated of load, the movement between entry and exit from each stage is programmable introducing wholly new conveyor control possibilities tailorable to the requirements of particular jobs and functions while providing substantial operational savings and installational economies and long term flexibility in adding or subtracting zones and precision location for specific achievements while passing loads between entry and exit of successive zones. Accordingly the present invention opens substantially new program control possibilities and such controls are not the subject of the present invention.

In general, a load enters zone I and after selected time delay I, II and III are started and consecutively deliver the load to zone III where the stop sensor such as the limit switch of light interference module 50 in FIG. 1 distinguishes the presence of the load and prevents encroachment on the zone III until load removal. The zones I and II shut down once achieving full movement in their zones and subject to time and operational delays selected in such independent movement. On emptying zone I to zone II activating a zone sensor and after programmed delays and movement in the zone I and completion of zone II movement, the zone I shifts the load smoothly to zone II following movement of the zone II load into the zone III. After programmed movement in zones I and II further movement awaits the removal of the load from the zone III.

Starting the drive of each zone operation is upon entry of the zone by the load and stopping of zone occurs selectively, as programmed, and dependent upon the next succeeding zone being emptied of its load.

In most programmed situations the unload station is given operational priority assuring item availability at the unload position in zone III. As will be understood additional zones may be added in accord with selected sequencing through any number of successive zones and position with each zone.

Having thus described the accumulator conveyor in its operative and preferred setting those ordinarily skilled in the art will perceive modifications, changes and improvement. Such modifications, changes and improvements are intended to be included herein limited only by the scope of the hereinafter appended claims.

I claim:

1. An improved endless plural zone chain drive accumulator conveyor, each zone of said conveyor independently driven, comprising:
    a support frame for each of said zone;
    at least two spaced apart fixed parallel track elements in each zone, each of said track elements having a bed of staggered rollers providing an upper plural footed anti-friction planar support base and attached to and supported by said support frame and said track elements in offset parallel relation in successive zones;

endless transfer chains riding on each of said parallel track elements and in planar support on said beds of anti-friction rollers in each of said zones and said chains providing planar bridging support between adjacent of said zones;

a shaft adjacent the ends of said track elements and adjacent of said zones and spanning and beneath said track elements as supported by said frame;

sprocket means on said shafts driveably engaged with said transfer chains in each of said zones, said sprocket means including an idling sprocket on one of said shafts and a driving sprocket on the other of said shafts being driven;

drive means driveably connected to each of said shafts and said idling sprockets are in axially spaced adjacent relation to said driving sprockets on said shafts over which said endless transfer chain is trained; said idling and driving sprockets on adjacent successive shafts are in aligned relation, whereby each of said zones is separately driven.

2. A transfer chain improved conveyor of the accumulator type wherein a cargo is supported movably on said transfer chain and the conveyor having plural separately driven zones in end-to-end modular relation, the combination comprising:

at least a pair of parallel spaced apart anti-friction tracks, each presenting plural anti-friction staggered planar oriented roller surfaces in each zone of said conveyor, said tracks in next successive of said zone in staggered adjacent parallel relation to the track in the preceeding of said zones;

a conveyor frame rigidly and fixedly supporting said anti-friction tracks in staggered next adjacent parallel relation in each of said successive zones;

separate endless transfer chains in movable planar contact over said tracks in each of said zones and said chains in contact with said roller surfaces providing cargo bridging support between adjacent of said zones;

shafts at each end of said zones operably journalled and supported in said frame, said shafts all common to successively adjacent of said zones except for the endmost of said shafts of said conveyor;

drive sprockets on said shafts in each of said zones and operably engaging one of said pair of transfer chains;

separate motor means connected to drive said shafts and said drive sprockets in each of said zones; and idling sprockets axially spaced adjacent said drive sprockets on said shafts and alignably connected to the other of said pair of chains in said next successive adjacent zone whereby all of said transfer chains supporting cargo travel on anti-friction track in separate zones are separately powered as desired.

3. An improved accumulator conveyor having plural successive zones each of said zones separately powered comprising:

at least a pair of spaced apart fixed parallel track elements in each said zone, each of said track elements having a bed of staggered rollers providing an upper plural footed anti-friction planar support base;

endless transfer chains in planar running support engaged with each of said roller beds in each of said zones;

a shaft at each end of said zones over which said transfer chains pass, said transfer chains providing a continuous planar support surface between successive zones and said shafts driveably engaged with said transfer chain at one end and said transfer chain in idling engagement with said shafts at the other end of each of said zones;

separate drive means connected to said shafts at one end of each of said zones and selectively activated to drive said transfer chain in each of said zones;

tensioning means beneath said anti-friction roller beds in engagement with said endless transfer chain; and control means limiting movement of said transfer chain in each of said zones in coordination with movement in other of said zones.

* * * * *